US012683810B2

(12) United States Patent
Jakobsen et al.

(10) Patent No.: US 12,683,810 B2
(45) Date of Patent: Jul. 14, 2026

(54) RADIO AUTHENTICATION AS ROOT OF TRUST FOR TRANSPORT LAYER SECURITY

(71) Applicant: MOTOROLA SOLUTIONS, INC., Chicago, IL (US)

(72) Inventors: Ken Jakobsen, Vaerlose (DK); Kristian Gronkjaer Pedersen, Vaerlose (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 227 days.

(21) Appl. No.: 18/670,358

(22) Filed: May 21, 2024

(65) Prior Publication Data

US 2025/0365163 A1 Nov. 27, 2025

(51) Int. Cl.
H04L 29/06 (2006.01)
H04L 9/32 (2006.01)

(52) U.S. Cl.
CPC .......... H04L 9/3268 (2013.01); H04L 9/3271 (2013.01)

(58) Field of Classification Search
None
See application file for complete search history.

(56) References Cited

U.S. PATENT DOCUMENTS 8,856,509 B2 10/2014 Nakhjiri et al.
11,051,138 B1 * 6/2021 McDonald .............. H04W 4/12
11,178,279 B1 * 11/2021 Ramu ................... H04M 7/006

(Continued)

FOREIGN PATENT DOCUMENTS

AU 2013246270 B2 * 11/2015 ............ H04W 12/04
CA 2958215 C * 10/2020 .............. H04W 4/70

(Continued)

OTHER PUBLICATIONS

M. Sbeiti, T. Tran, S. Subik, A. Wolff and C. Wietfeld, "MuSE: Novel Efficient Multi-Tier Communication Security Model for Emergency and Rescue Operations," 2011 IEEE Eighth International Conference on Mobile Ad-Hoc and Sensor Systems, Valencia, Spain, 2011, pp. 929-934, doi: 10.1109/MASS.2011.112. (Year: 2011).*

(Continued)

*Primary Examiner* — Jeffery L Williams
(74) *Attorney, Agent, or Firm* — Michael Best & Friedrich LLP

(57) ABSTRACT

A converged radio device (MS) is configured to perform communication in an internet protocol (IP) based network and authenticate with a switching and management infrastructure (SwMI) of a second network by using pre-existing radio authentication as a root of trust for an unauthenticated IP session established between the MS and a server associated with the SwMI. The MS receives a first challenge from the SwMI via the server, and determines a result of the first challenge using data derived from a certificate associated with the server. The MS transmits, to the SwMI via the server, a second challenge and the result of the first challenge. The MS authenticates the SwMI by verifying a result of the second challenge received from the SwMI via the server matches an expected result of the second challenge. Responsive to a mutual authentication, the MS performs communication in the radio network via the server.

20 Claims, 5 Drawing Sheets

(56) References Cited

U.S. PATENT DOCUMENTS

| | | | | |
|---|---|---|---|---|
| 2002/0166048 | A1 | 11/2002 | Coulier | |
| 2007/0121564 | A1* | 5/2007 | Petersen | H04W 8/06 |
| | | | | 370/338 |
| 2008/0013740 | A1* | 1/2008 | Sowa | H04L 63/062 |
| | | | | 380/286 |
| 2009/0210712 | A1 | 8/2009 | Fort | |
| 2010/0037053 | A1* | 2/2010 | Stenberg | H04L 9/0838 |
| | | | | 713/168 |
| 2012/0102319 | A1 | 4/2012 | Falk et al. | |
| 2016/0014818 | A1* | 1/2016 | Reitsma | H04W 76/50 |
| | | | | 370/254 |
| 2016/0036854 | A1* | 2/2016 | Himawan | H04L 63/04 |
| | | | | 726/5 |
| 2016/0142211 | A1* | 5/2016 | Metke | H04L 63/0823 |
| | | | | 713/175 |
| 2016/0150382 | A1* | 5/2016 | Lagerman | H04W 12/02 |
| | | | | 455/519 |
| 2017/0231014 | A1* | 8/2017 | Patel | H04W 76/45 |
| 2019/0007803 | A1* | 1/2019 | Sedlacek | H04W 12/106 |
| 2019/0037617 | A1* | 1/2019 | Kapatralla | H04L 65/1073 |
| 2020/0036694 | A1* | 1/2020 | Mills | H04L 63/18 |
| 2021/0377051 | A1* | 12/2021 | Pai | H04L 9/0825 |
| 2025/0175359 | A1* | 5/2025 | Bockrath | H04W 76/45 |
| 2025/0365163 | A1* | 11/2025 | Jakobsen | H04L 63/0869 |

FOREIGN PATENT DOCUMENTS

| | | | | | |
|---|---|---|---|---|---|
| CA | 3169389 | A1 * | 9/2021 | | H04W 4/08 |
| EP | 1121822 | B1 | 12/2007 | | |
| EP | 3328108 | A1 | 5/2018 | | |
| WO | WO-2006094088 | A1 * | 9/2006 | | H04L 12/66 |
| WO | WO-2018105022 | A1 * | 6/2018 | | H04W 36/00226 |
| WO | 2022114760 | A1 | 6/2022 | | |

OTHER PUBLICATIONS

B. Dolanc and M. Judez, "Professional mobile system—TETRA over IP and IP over TETRA," The IEEE Region 8 EUROCON 2003. Computer as a Tool., Ljubljana, Slovenia, 2003, pp. 173-177 vol. 1, doi: 10.1109/EURCON.2003.1248004. (Year: 2003).*

ETSI, LTE; Mission Critical (MC) services over LTE; Part 2: Mission Critical Push To Talk (MCPTT) User Equipment (UE) Protocol conformance specification (3GPP TS 36.579-2 version 15.4.0 Release 15); ETSI TS 136 579-2 V15.4.0, Aug. 2022, p. 1-727. (Year: 2022).*

ETSI, "LTE; Mission Critical Push To Talk (MCPTT) identity management; Protocol specification, (3GPP TS 24.382 version 13.0.1 Release 13)", ETSI TS 124 382 V13.0.1, May 2016, p. 1-16. (Year: 2016).*

TCCA, "TCCA White Paper: Introduction to Mission Critical Service Interoperability", Jan. 2020, p. 1-17. (Year: 2020).*

TCCA, "TETRA Connectivity to LTE", Aug. 2018, p. 1-15. (Year: 2018).*

Donner, Anton, Saleemi, Jawad Ahmed, Mulero Chaves, Javier, TETRA Backhauling via Satellite: Improving Call Setup Times and Saving Bandwidth, Journal of Computer Networks and Communications, 2014, 562546, 16 pages, 2014. https://doi.org/10.1155/2014/562546 (Year: 2014).*

ETSI, "Terrestrial Trunked Radio (TETRA); Voice plus Data (V+D); Part 3: Interworking at the Inter-System Interface (ISI); Sub-part 11: General design, SIP/IP", ETSI EN 300 392-3-11 V1.2.1, Apr. 2020, p. 1-33. (Year: 2020).*

Extended European Search Report for Application No. 25176926.1 dated Jun. 17, 2025 (7 pages).

Hoffman et al. RFC6698 The DNS-Based Authentication of Named Entities (DANE). Aug. 2012. Available online at https://www.rfc-editor.org/rfc/pdfrfc/rfc6698.txt.pdf (37 pages).

* cited by examiner

500

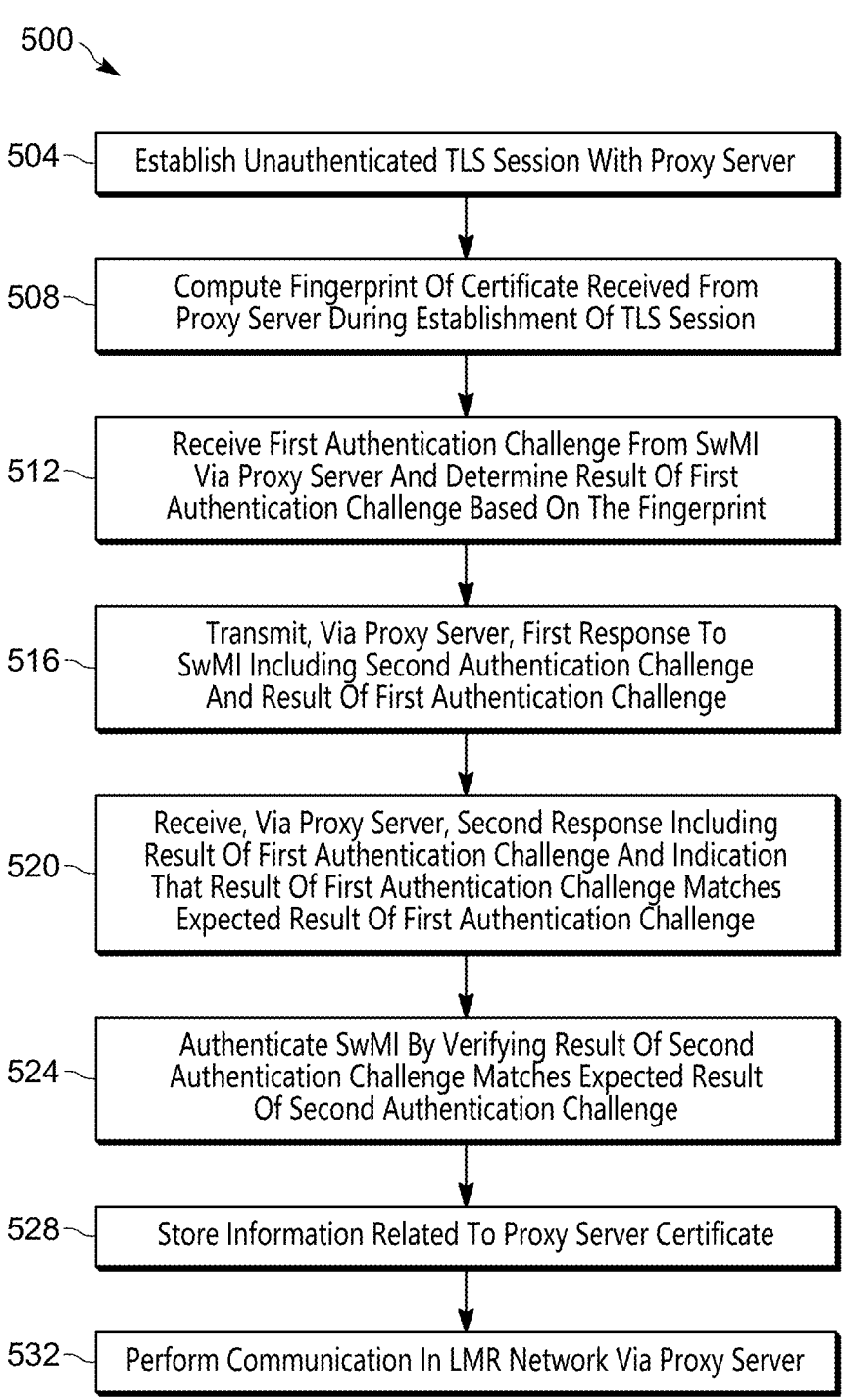

504 — Establish Unauthenticated TLS Session With Proxy Server

508 — Compute Fingerprint Of Certificate Received From Proxy Server During Establishment Of TLS Session 512 — Receive First Authentication Challenge From SwMI Via Proxy Server And Determine Result Of First Authentication Challenge Based On The Fingerprint 516 — Transmit, Via Proxy Server, First Response To SwMI Including Second Authentication Challenge And Result Of First Authentication Challenge 520 — Receive, Via Proxy Server, Second Response Including Result Of First Authentication Challenge And Indication That Result Of First Authentication Challenge Matches Expected Result Of First Authentication Challenge 524 — Authenticate SwMI By Verifying Result Of Second Authentication Challenge Matches Expected Result Of Second Authentication Challenge 528 — Store Information Related To Proxy Server Certificate 532 — Perform Communication In LMR Network Via Proxy Server

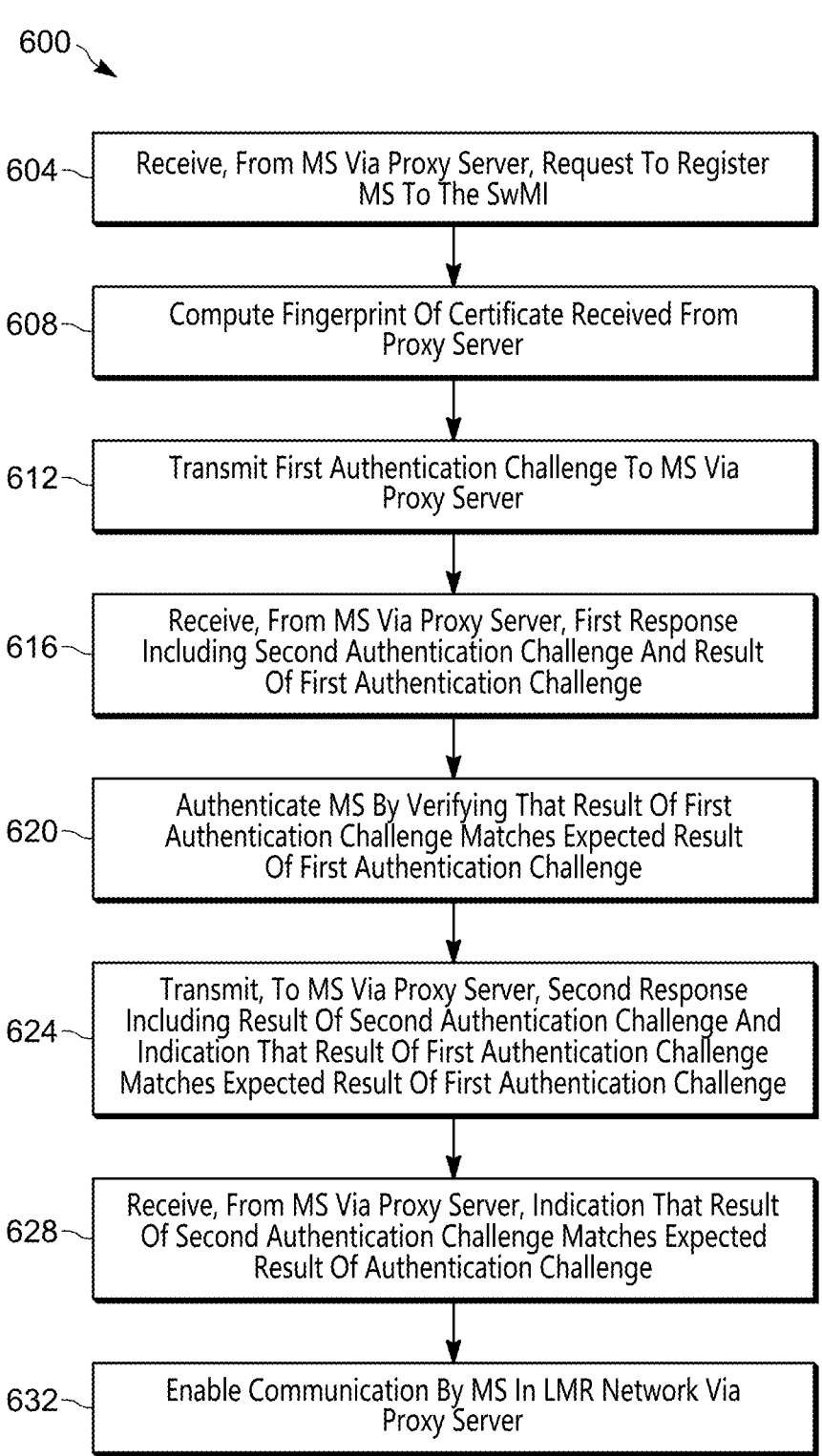

604 — Receive, From MS Via Proxy Server, Request To Register MS To The SwMI

608 — Compute Fingerprint Of Certificate Received From Proxy Server

612 — Transmit First Authentication Challenge To MS Via Proxy Server

616 — Receive, From MS Via Proxy Server, First Response Including Second Authentication Challenge And Result Of First Authentication Challenge 620 — Authenticate MS By Verifying That Result Of First Authentication Challenge Matches Expected Result Of First Authentication Challenge 624 — Transmit, To MS Via Proxy Server, Second Response Including Result Of Second Authentication Challenge And Indication That Result Of First Authentication Challenge Matches Expected Result Of First Authentication Challenge 628 — Receive, From MS Via Proxy Server, Indication That Result Of Second Authentication Challenge Matches Expected Result Of Authentication Challenge 632 — Enable Communication By MS In LMR Network Via Proxy Server

FIG. 6

RADIO AUTHENTICATION AS ROOT OF TRUST FOR TRANSPORT LAYER SECURITY

BACKGROUND

Wireless communication devices transfer information using various communication modalities. To satisfy the needs of a particular communication system or user, some wireless communication devices include features that support communications via multiple communication modalities. Devices with such features are sometimes referred to as converged devices. Communication modalities that some converged devices are compatible with include, for example, internet protocol (IP) based communication modalities (e.g., WiFi, long term evolution (LTE), or other cellular communication protocols) and land mobile radio (LMR) protocols, such as terrestrial trunked radio (TETRA). Some converged devices are configurable to access multiple distinct wireless networks, for example, both LTE and LMR networks, including networks that are either public or private.

BRIEF DESCRIPTION OF THE DRAWINGS

FIG. 5 illustrates a method for authenticating, with a converged radio device, a radio network infrastructure, according to some examples.

FIG. 6 illustrates a method for authenticating, with a radio network infrastructure, a converged radio device, according to some examples.

Figure 1:
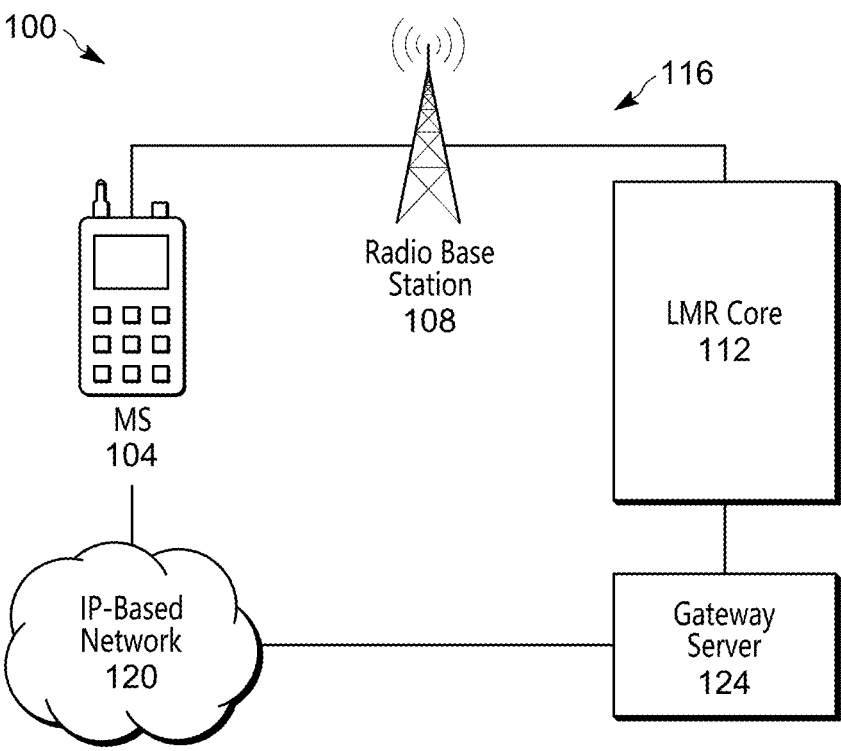
FIG. 1 illustrates a communication system for a converged device, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Converged wireless communication devices, often referred to herein as converged devices, are devices capable of communicating within multiple communication systems implementing different communication protocols. In some instances, converged devices include, in essence, two radios—a land mobile radio (LMR) and a broadband radio—for communicating in an IP based communication system (e.g., a WiFi communication system, long term evolution (LTE) communication system, or the like). Other communication protocols that may be implemented by the converged device include, for example, the Project 25 (P25)

standard defined by the Association of Public Safety Communications Officials International (APCO), the TETRA standard defined by the European Telecommunication Standards Institute (ETSI), the Digital Private Mobile Radio (dPMR) standard also defined by the ETSI, the Digital Mobile Radio (DMR) standard also defined by the ESI, LTE-Advanced or LTE-Advanced Pro compliant with, for example, the 3GPP TS 36 specification series, or the 5G (including a network architecture compliant with, for example, the 3GPP TS 23 specification series and a new radio (NR) air interface compliant with the 3GPP TS 38 specification series) standard, among other possibilities.

Converged devices may be configured to switch transmission from a first communication protocol, or modality, to a second communication protocol or modality based on coverage information related to respective communication modalities. For example, a converged device may switch from performing communication in an LMR network to performing communication in an IP-based network when LMR coverage is below a threshold (e.g., when the converged device is at an edge of a TETRA cell). During operation according to the IP-based communication protocol, the converged device may communicate with an IP-enabled gateway or proxy server associated with the LMR network. The proxy server operates as a gateway to the LMR network and therefore enables the converged device to continue communications in the LMR network even when LMR coverage is insufficient.

Performing communication in an LMR network via an IP-based network (e.g., using the IP-enabled proxy server) presents a risk of a man in the middle (MITM) attack. Mutual authentication of the LMR infrastructure and the converged device, often referred to herein as a mobile station (MS), requires that the MS is provisioned with a client certificate and a root certificate for server certificates. However, distributing root certificates to a fleet of converged device is a laborious and challenging task.

Thus, there is a need for mutual authentication between a MS and a radio network infrastructure without pre-shared certificates. One example provides a converged radio device including: a radio-frequency (RF) transmitter system configured to perform communication in an internet protocol (IP) based network; and an electronic processor configured to authenticate with a switching and management infrastructure (SwMI) of a second network of a different modality than the IP-based network by establishing an unauthenticated secure IP session with a proxy server associated with the SwMI, computing data derived from a certificate received from the proxy server during establishment of the secure IP session, receiving, via the proxy server, a first authentication challenge from the SwMI, determining a result of the first authentication challenge based on the data derived from the certificate, transmitting a first response to the SwMI via the proxy server, the first response including a second authentication challenge and the result of the first authentication challenge, receiving, from the SwMI via the proxy server, a second response including a result of the second authentication challenge and an indication that the result of the first authentication challenge matches an expected result of the first authentication challenge, authenticating the SwMI by verifying that the result of the second authentication challenge matches an expected result of the second authentication challenge, and responsive to authenticating the SwMI, performing communication in the second network via the proxy server.

In some aspects, determining the result of the first authentication challenge includes computing a modified value based on a base value received or generated by the MS during authentication with the SwMI and the data derived from the certificate.

In some aspects, the electronic processor is configured to compute the modified value according to a hash function of the base value and the data derived from the certificate.

In some aspects, the first authentication challenge includes a random number and a random seed RS used for generating the random number, and the modified value is a modified random number based on the random number and the data derived from the certificate.

In some aspects, the first authentication challenge includes a random seed RS, and determining the result of the first authentication challenge further includes computing a session key KS based on the random seed RS and a shared key K, and computing the result of the first authentication challenge according to a function of the modified value and the session key KS.

In some aspects, the second network is a land mobile radio (LMR) TETRA network, and the electronic processor is configured to compute the session key KS using a first TETRA algorithm, and the function of the modified value and the session key KS is a second TETRA algorithm.

In some aspects, verifying that the result of the second authentication challenge matches an expected result of the second authentication challenge includes computing the expected result of the second authentication challenge based on the data derived from the certificate, and determining that the result of the second authentication challenge matches the expected result of the second authentication challenge.

Another example provides a system for a switching and management infrastructure (SwMI) of a LMR network, the system including: an electronic processor configured to authenticate a mobile station (MS) to the SwMI by receiving, from the MS via a proxy server associated with the SwMI, a request to register to the LMR network, transmitting, to the MS via the proxy server, a first authentication challenge, receiving, from the MS via the proxy server, a first response including a second authentication challenge and a result of the first authentication challenge, authenticating the MS by verifying that the result of the first authentication challenge matches an expected result of the first authentication challenge, determining a result of the second authentication challenge based on data derived from a certificate received from the proxy server, transmitting a second response to the MS via the proxy server, the second response including the result of the second authentication challenge and an indication that the result of the first authentication challenge matches an expected result of the first authentication challenge, responsive to receiving, from the MS via the proxy server, an indication that the result of the second authentication challenge matches an expected result of the second authentication challenge, enabling communication by the MS in the LMR network via the proxy server.

In some aspects, determining the result of the second authentication challenge includes computing a modified value based on a base value received or generated by the SwMI during authentication with the MS and the data derived from the certificate.

In some aspects, the second authentication challenge includes a random number, and the modified value is a modified random number based on a hash function of the random number and the data derived from the certificate.

In some aspects, determining the result of the first authentication challenge further includes computing a session key KS' based on a random seed RS and a shared key K, and computing the result of the second authentication challenge according to a function of the modified value and the session key KS'.

In some aspects, the LMR network is a TETRA network, and the electronic processor is configured to compute the session key KS' using a first TETRA algorithm, and the function of the modified value and the session key KS' is a second TETRA algorithm.

In some aspects, verifying that the result of the first authentication challenge matches an expected result of the first authentication challenge includes computing the expected result of the first authentication challenge based on the data derived from the certificate, and determining that the result of the first authentication challenge matches the expected result of the second authentication challenge.

Another example provides a method for mutually authenticating a LMR Mobile Station (MS) with a switching and management infrastructure (SwMI) of a LMR network, the method including: establishing, with the MS, a secure internet protocol (IP) session with a proxy server associated with the SwMI; receiving, with the MS via the proxy server, a first authentication challenge from the SwMI; determining, with the MS, a result of the first authentication challenge based on first data derived from a certificate received from the proxy server during establishment of the secure IP session; authenticating the MS by verifying, with the SwMI, that the result of the first authentication challenge matches an expected result of the first authentication challenge; transmitting, with the MS, a second authentication challenge to the SwMI via the proxy server; determining, with the SwMI, a result of the second authentication challenge based on second data derived from a certificate known to be from the proxy server; authenticating the SwMI by verifying, with the MS, that the result of the second authentication challenge matches an expected result of the second authentication challenge; and responsive to mutual authentication of the SwMI and the MS, performing communication, with the MS, in the LMR network via the proxy server.

In some aspects, the method further includes: responsive to mutual authentication of the SwMI and the MS, storing in a memory associated with the MS, information related to the certificate received from the proxy server; and using the information related to the certificate received from the proxy server during authentication in a subsequent secure IP session with the proxy server.

In some aspects, the method further includes: responsive to mutual authentication of the SwMI and the MS, transmitting, with the MS, a certificate signing request (CSR) to the proxy server.

In some aspects, the secure IP session is a TLS session.

In some aspects, the proxy server is a gateway to the LMR network.

In some aspects, prior to mutual authentication of the MS and the SwMI and after establishment of the secure IP session with the MS, the proxy server restricts access of the MS to the LMR network.

In some aspects, the MS connects to the proxy server from at least one selected from the group consisting of cellular network and a WiFi network, and mutually authenticating the MS with the SwMI is performed after authentication of the MS to the cellular network or the WiFi network.

Examples are herein described with reference to flowchart illustrations and/or block diagrams of methods, apparatus (systems) and computer program products according to examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some examples, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 illustrates a communication system 100, according to some examples. The system 100 includes a converged radio device 104, often referred to herein as a mobile station (MS) 104, operable to communicate according to a first communication protocol and a second communication protocol different from the first communication protocol.

Figure 2:
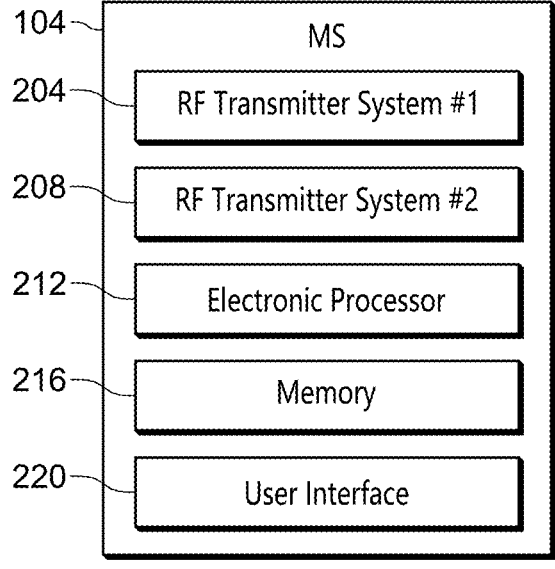
FIG. 2 illustrates a converged device, according to some examples.

FIG. 2 schematically illustrates the MS 104, according to some examples. In the example illustrated in FIG. 2, the MS 104 includes a first radio-frequency (RF) transmitter system 204 configured to transmit communication signals according to a first communication protocol and a second RF transmitter system 208 configured to transmit communication signals according to a second communication protocol different from the first communication protocol. The MS 104 further includes an electronic processor 212 (i.e., one or more electronic processors 212) configured to control operation of the MS 104. A memory 216 stores information related to operation of the MS 104, such as program instructions that, when executed by the electronic processor 212, cause the electronic processor to perform, among other things, the methods described herein. The memory 216 may further store certificates, shared keys, or other data used for performing communication according to the first or second communication protocols. The MS 104 further includes a user interface 220. The user interface 220 includes, among other things, a microphone for receiving voice data from a user of the MS 104 to be transmitted using the first RF transmitter system 204 and/or the second RF transmitter system 208. The user interface 220 may further include a speaker for outputting, to the user, sound data received via the first RF transmitter system 204 and/or the second RF transmitter system 208.

Referring again to FIG. 1, during operation according to the first communication protocol, the MS 104 communicates with a LMR base station 108 of an LMR network, using, for example, the first RF transmitter system 208. The LMR base station 108 represents one of a plurality of LMR base stations 108 communicatively connected to an LMR core network 112. The LMR core network 112, or LMR core 112, includes, a collection of network hardware devices (e.g., switches, routers, processors, etc.) for providing core services of the LMR network. The LMR base stations 108 and the LMR core network 112 define a switching and management infrastructure (SwMI) 116. In one example, the SWMI is TETRA SwMI.

During operation according to the second communication protocol, the MS 104 communicates within IP-based network 120, for example a WiFi network, cellular broadband network, satellite internet network, and/or the like. The MS 104 communicates in the IP-based network using, for example, the second RF transmitter system 208. The MS 104 may switch from operation according to an LMR protocol to operation according to an IP-based protocol responsive to, for example, detecting that LMR coverage is below a threshold. To maintain communications with limited interruption, the MS 104 connects to an IP-enabled gateway server 124, otherwise referred to as a proxy server 124, associated with the SwMI 116 but firewalled from the LMR core 112. The proxy server 124 enables the MS 104 to continue ongoing transmissions to the LMR core 112 (e.g., connecting the MS 104 to the same LMR call) using an IP-based communication protocol when LMR communication via the LMR base station 108 is otherwise unavailable.

To perform communication with the SwMI 116 according to the LMR communication protocol, the MS 104 locates the base station 108 and performs a mutual authentication with the SwMI 116 (e.g., with the LMR core 112 via the LMR base station 108). Similarly, to perform communication with the SwMI 116 according to the IP-based communication protocol, the MS 104 is configured to perform mutual authentication with the SwMI 116 via the proxy server 124.

Figure 3:
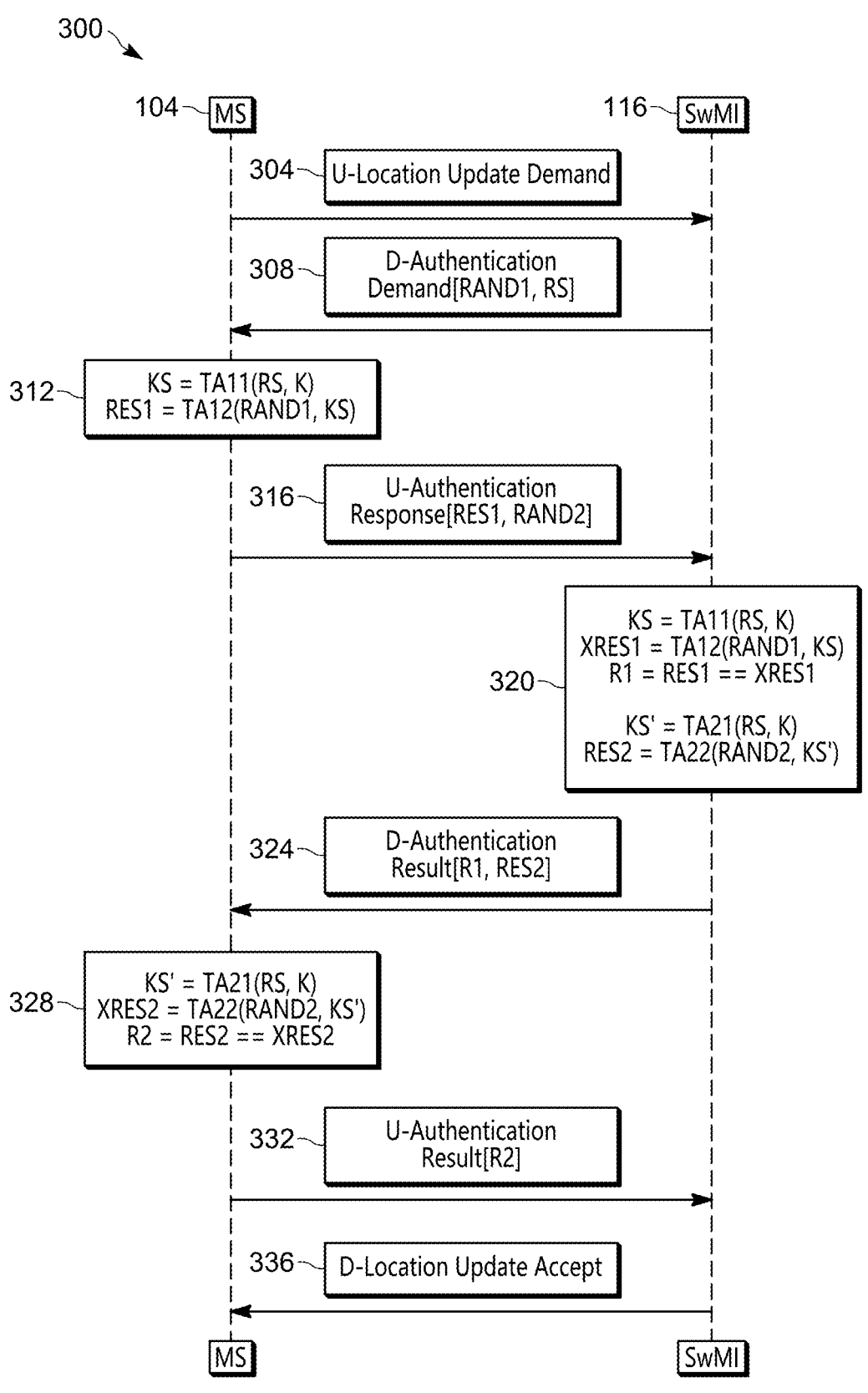
FIG. 3 illustrates a method for mutual authentication of a radio device and a radio network infrastructure in a first network, according to some examples.

FIG. 3 illustrates an example method 300 of performing a conventional LMR authentication (e.g., a TETRA authentication) between the MS 104 and the SwMI 116 during LMR communication via the LMR base station 108. The method 300 is performed with respect to the MS 104 (e.g., the electronic processor 212 and the first RF transmitter system 204) and the SwMI 116 (e.g., the LMR core 112 and the LMR base station 108). For example, communication between the MS 104 and the LMR core 112 is performed by way of the LMR base station 108.

The method 300 may be performed in response to activation of the MS 104 (e.g., powering on the MS 104). For example, in response to powering on, the MS 104 may locate a nearby LMR base station 108, and transmit a request to register to the LMR network (e.g., U-Location Update Demand) (at block 304). In response to the request to register to the LMR network, the SwMI 116 transmits a first authentication challenge to the MS 104 (e.g., D-Authentication Demand) including a first random number RAND1 and random seed RS used for generating the first random number RAND1 (at block 308).

Responsive to receiving the first authentication challenge, the MS 104 computes a result of the first authentication challenge using the random number RAND1, the random seed RS, and a key K (at block 312). The key K is a secret key shared between the MS 104 and the SwMI 116. The key K is loaded to the MS 104 and the SwMI 116 by, for example, a key variable loader (KVL). The MS 104 computes the result RES1 of the first authentication challenge by first computing a first session key KS based on a function of the random seed RS and the shared key K, for example. The first session key KS may be computed using a first predefined TETRA authentication algorithm (e.g., TETRA algorithm TA11). The MS 104 computes the result RES1 of the first authentication challenge as a function of the first session key KS and the first random number RAND1, for example, using a second predefined TETRA authentication algorithm (e.g., TETRA authentication algorithm TA12).

The MS 104 transmits a first response to the SwMI 116 (e.g., U-Authentication Response) including a second authentication challenge and the result RES1 of the first authentication challenge (at block 316). The second authentication challenge includes, for example, a second random number RAND2 generated using the random seed RS.

The SwMI 116 verifies the result RES1 matches an expected result XRES1 of the first authentication challenge by computing the first session key KS as a function (e.g., the first predefined TETRA authentication algorithm TA11) of the random seed RS and the shared key K, and computing the expected result XRES1 of the first authentication challenge as a function (e.g., the second predefined TETRA authentication algorithm TA12) of the first random number RAND1 and the first session key KS (at block 320).

The SwMI 116 also determines a result of the second authentication challenge by first computing a second session key KS' as a function (e.g., a third predefined TETRA authentication algorithm, such as TA21) of the random seed RS and the shared key K. The SwMI 116 computes the result RES2 of the second authentication challenge as a function (e.g., a fourth predetermined TETRA authentication algorithm, such as TA22) of the second random number RAND2 and the second session key KS'.

The SwMI 116 transmits the second response to the MS 104 (e.g., D-Authentication Result) including an indication R1 that the result RES1 of the first authentication challenge matches (e.g., is equal to) the expected result XRES1 of the first authentication challenge, and the result RES2 of the second authentication challenge (at block 324).

The MS 104 verifies that the result RES2 matches an expected result XRES2 of the second authentication challenge by computing the second session key KS' as a function (e.g., the third predefined TETRA authentication algorithm TA21) of the random seed RS and the shared key K, and computing the expected result XRES2 of the second authentication challenge as a function (e.g., the fourth predefined TETRA authentication algorithm TA22) of the second random number RAND2 and the second session key KS' (at block 328). The MS 104 transmits a third response including an indication R2 that the result RES2 of the second authentication challenge matches the expected result XRES2 of the second authentication challenge (at block 332). In response to receiving the indication R2, the SwMI 116 accepts registration of the MS 104 to the LMR network (D-Location Update Accept) and enables communication by the MS 104 in the LMR network via the LMR base station 108 (at block 336).

Figure 4:
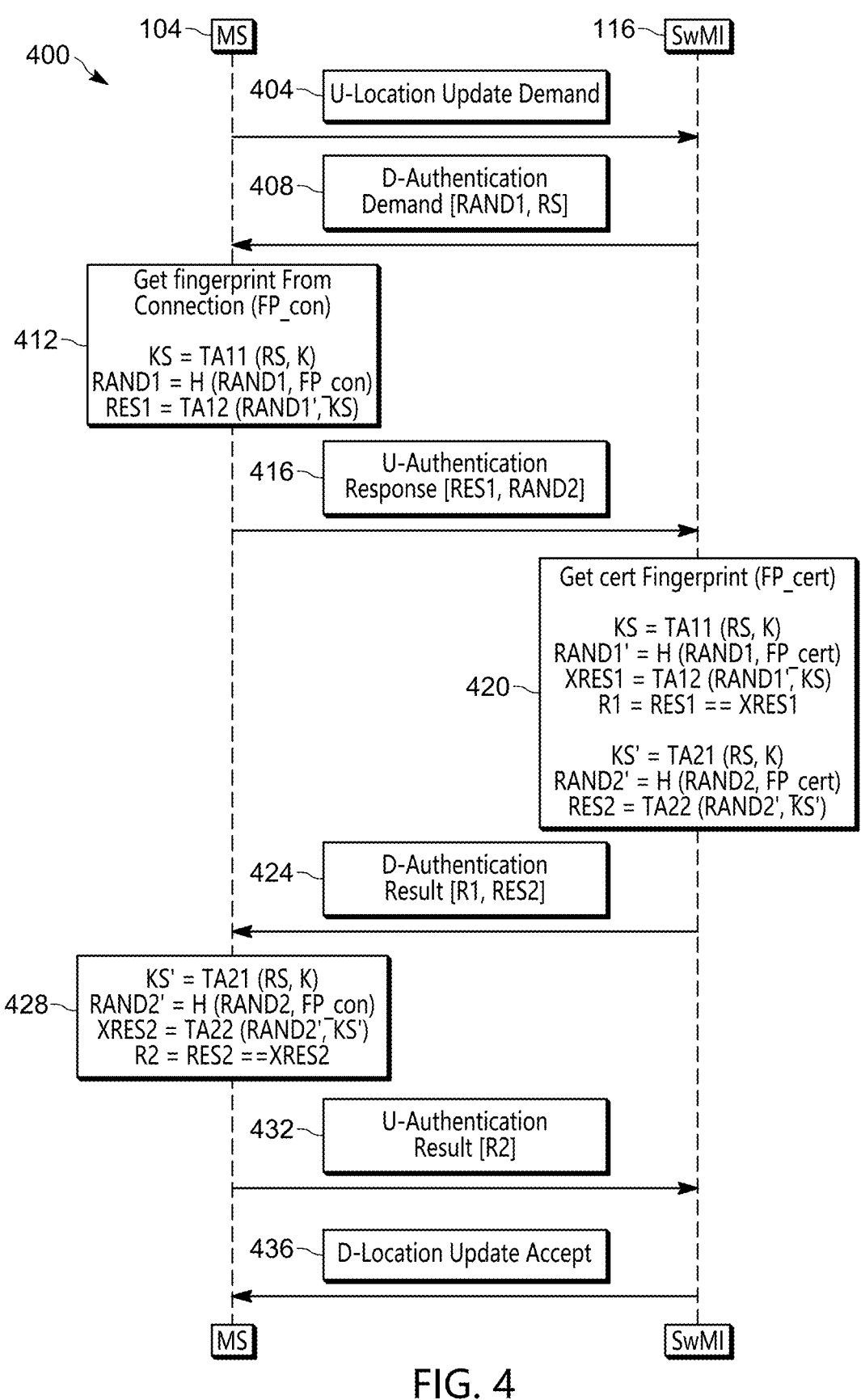
FIG. 4 illustrates a method for mutual authentication of a radio device and a radio network infrastructure in a second network, according to some examples.

Referring again to FIG. 1, in order to perform communication according to the second communication protocol (i.e., the IP-based communication protocol), the MS 104 establishes a secure IP session with the proxy server 124, such as a transport layer security (TLS) session. However, a standard LMR authentication process (e.g., the TETRA authentication method 300 described above with respect to FIG. 3), may be insufficient to protect against MITM attacks on the unauthenticated IP session. As an alternative to standard TETRA authentication, converged devices can be provisioned with client certificates and root certificates, which is a laborious task. Therefore, to improve efficiency and reliability of operation of the MS 104 in the IP-based network, FIG. 4 illustrates a modified authentication method 400 that uses a pre-existing LMR authentication (e.g., TETRA authentication) as a root of trust for an IP session, such as a TLS session.

The method 400 is performed with respect to the MS 104 (e.g., the electronic processor 212 and the second RF transmitter system 208) and the SwMI 116 (e.g., the LMR core 112). Communication between the MS 104 and the LMR core 112 is performed by way of the proxy server 124, or gateway server 124. For example, the MS 104 does not directly communicate with the LMR core 112. Rather, the MS 104 communicates with the proxy server 124 over the IP-based network 120, and the proxy server 124 in turn communicates with the LMR core 112 of the SwMI 116 to facilitate mutual authentication of the MS 104 and the SwMI 116.

The method 400 may be performed in response to activation of an IP-based communication mode (e.g., in response to a drop in LMR coverage, in response to a user selection of the IP-based communication mode, and/or another trigger condition). When the MS 104 initially connects to the IP-based network 120, the MS 104 may perform an initial authentication with the IP-based network separate from an authentication performed with respect to the SwMI 116.

In response to activation of the IP-based communication mode, the MS 104 transmits, to the SwMI 116 via the proxy server 124, a request to register to the LMR network (e.g., U-Location Update Demand) (at block 404). In response to the request to register to the LMR network, the SwMI 116 transmits to the MS 104, via the proxy server 124, a first authentication challenge (e.g., D-Authentication Demand) including, for example, a first random number RAND1 and/or random seed RS used for generating the first random number RAND1 (at block 408).

Responsive to receiving the first authentication challenge, the MS 104 computes a result of the first authentication challenge using the random number RAND1, the random seed RS, a shared key K, and first data derived from a certificate associated with the IP connection (e.g., the TLS session) between the MS 104 and the proxy server 124 (at block 412). The first data derived from the certificate associated with the proxy server 124 and received by the MS 104 is identifying data associated with the certificate. For example, the first data derived from the certificate may be a fingerprint FP_con computed from a portion or all of a certified received by the MS 104 from the proxy server during establishment of One example of the first data derived from the certificate of the proxy server 124 received by the MS 104 is the fingerprint FP_con. Other examples include those described above.

The key K is the secret key shared between the MS 104 and the SwMI 116 and used for LMR authentication between the MS 104 and the SwMI 116 (e.g., in the method 300 described above with respect to FIG. 3). By relying on the pre-existent shared key K, the MS and the SwMI 116 may perform mutual authentication of one another via the proxy server 124 without the need for pre-shared certificates.

In using pre-existing LMR authentication as a base for trust for the TLS authentication, the MS 104 computes a first session key KS based on a function of the random seed RS and the shared key K. The first session key KS may be computed using a first predefined algorithm (e.g., a pre-defined TETRA authentication algorithm, such as TA11). While various TETRA authentication algorithms are described herein, the MS 104 and/or the SwMI 116 may compute values using authentication functions other than the TETRA authentication algorithms described herein (e.g., other TETRA functions, or functions that are not associated with TETRA).

Because relying only on the shared key K may be insufficient to protect against, for example, a MITM attack during communication performed by way of the proxy server 124, in some instances. the MS 104 also computes a first modified value based on the first data derived from the certificate associated with the IP connection to the proxy server 124 (e.g., the fingerprint FP_con) and a first base value received or generated by the MS 104 during authentication with the SwMI 116. The first base value may be, for example, the first random number RAND1, the random seed RS, the shared key K, the first session key KS, or an output value generated by the MS 104. The MS 104 computes the modified value according to a predefined function (e.g., a predefined hash function H) known to the SwMI 116 that mixes the first data derived from the certificate (e.g., FP_con) with the base value. One example of the first modified value is a first modified random number RAND1' computed by the MS 104 based on the fingerprint FP_con and the first random number RAND1. Other examples include those described above.

In one example, the MS 104 computes the result RES1 of the first authentication challenge as a function of the first session key KS and the first modified random number RAND1', for example, using a second predefined TETRA authentication algorithm (e.g., TETRA authentication algorithm TA12).

In this example, the MS 104 transmits, to the SwMI 116 via the proxy server 124, a first response (e.g., U-Authentication Response) including a second authentication challenge and the result RES1 of the first authentication challenge (at block 416). In some instances, the second authentication challenge includes a second random number RAND2 generated using the random seed RS.

In some instances, the SwMI 116 verifies the result RES1 matches an expected result XRES1 of the first authentication challenge by computing second data derived from a certificate known by the SwMI 116 to be associated with the proxy server 124, computing the first session key KS as a function (e.g., the first predefined TETRA authentication algorithm TA11) of the random seed RS and the shared key K, and computing the first modified random number RAND1' according to the hash function H of the random number RAND1 and the second data derived from the certificate known to be from the proxy server 124 (at block 420). The second data derived from the certificate associated with the proxy server 124 and received by the SwMI 116 is identifying data associated with the certificate. For example, the second data derived from the certificate known to be associated with the proxy server 124 may be a fingerprint FP_cert computed by the SwMI 116 of at least a portion of the certificate known to be associated with the proxy server 124, a hash of at least a portion of the certificate known to be associated with the proxy server 124, and/or the like. One example of the second data derived from the certificate of the proxy server 124 received by the SwMI 116 the fingerprint FP_cert. Other examples include those described above.

The SwMI 116 computes the expected result XRES1 of the first authentication challenge as a function (e.g., the second predefined TETRA authentication algorithm TA12) of the first modified random number RAND1' and the first session key KS.

In some instances, the SwMI 116 computes and stores the expected result XRES1 of the first authentication challenge prior to receiving, from the MS 104 via the proxy server 124, the result of the first authentication challenge.

In some instances, the SwMI 116 also determines a result of the second authentication challenge by computing a second session key KS' as a function (e.g., a third predefined TETRA authentication algorithm, such as TA21) of the random seed RS and the shared key K.

The SwMI 116 also computes a second modified value based on the second data derived from the certificate (e.g., FP_con) and a second base value received or generated by the SwMI 116 during authentication of the MS 104. The second base value may be, for example, the second random number RAND2, the random seed RS, the shared key K, the second session key KS', or an output value generated by the SwMI 116. The SwMI 116 computes the second modified value according to a predefined function (e.g., a hash function H) that mixes the second data derived from the certificate known to be from the proxy server 124 (e.g., the fingerprint FP_con) with the second base value. One example of the second modified value is a second modified random number RAND2' computed by the SwMI 116 based on the fingerprint FP_con and the second random number RAND2. Other examples include those described above.

The hash function H used for computing the second modified random number RAND2' may be the same or different from the hash function H used for computing the first modified random number RAND1'. The SwMI 116 computes the result RES2 of the second authentication challenge as a function (e.g., a fourth predetermined TETRA authentication algorithm, such as TA22) of the second modified random number RAND2' and the second session key KS'.

The SwMI 116 transmits, to the MS 104 via the proxy server 124, the second response (e.g., D-Authentication Result) including an indication R1 that the result RES1 of the first authentication challenge matches (i.e., is equal to) the expected result XRES1 of the first authentication challenge, and including the result RES2 of the second authentication challenge (at block 424).

When the fingerprint FP_con computed by the MS 104 (e.g., based on the certificate of the proxy server 124 received by the MS 104) does not match the fingerprint FP_cert computed by the SwMI 116 (e.g., based on the certificate of the proxy server 124 received by the SwMI 116), or the shared key K loaded to the MS 104 (and stored, for example, in the memory 216 of the MS 104) does not the shared key K loaded to the SwMI 116 (and stored, for example, in a memory device included in the LMR core 112), the expected result XRES1 computed by the SwMI 116 will not match the result RES1 received by the SwMI 116 from the MS 104 via the proxy server 124. In such instances, the SwMI 116 and/or the MS 104 terminates the authentication process of the method 400. For example, the SwMI 116 may transmit an indication R1 that the result RES1 of the first authentication challenge does not match the expected result XRES1 of the first authentication challenge, and terminate the authentication process. Alternatively, the MS 104 may terminate the authentication process responsive to receiving an indication R1 that the result RES1 does not match the expected result XRES1 of the first authentication challenge. In contrast, when R1 indicates that the result RES1 does match the expected result XRES1 of the first authentication challenge, the authentication process of the method 400 continues.

The MS 104 verifies that the result RES2 matches an expected result XRES2 of the second authentication challenge by computing the second session key KS' as a function (e.g., the third predefined TETRA authentication algorithm TA21) of the random seed RS and the shared key K, computing the second modified random number RAND2' according to a hash function H of the second random number RAND2 and the fingerprint FP_con associated with the IP connection between the MS 104 and the proxy server 124, and computing the expected result XRES2 of the second authentication challenge as a function (e.g., the fourth predefined TETRA authentication algorithm TA22) of the second modified random number RAND2' and the second session key KS' (at block 428).

In some instances, the MS 104 computes and stores the expected result of the second authentication challenge prior to receiving, from the SwMI 116 via the proxy server 124, the result of the second authentication challenge.

The MS 104 transmits a third response (e.g., U-Authentication Result) including an indication R2 that the result RES2 of the second authentication challenge matches the expected result XRES2 of the second authentication challenge (at block 432). In response to receiving the indication R2, the SwMI 116 accepts registration of the MS 104 to the LMR network (D-Location Update Accept) and enables communication by the MS 104 in the LMR network via the proxy server 124 (at block 436).

When the fingerprint FP_cert computed by the SwMI 116 (e.g., based on the certificate of the proxy server 124 received by the SwMI 116) does not match the fingerprint FP_con computed by the MS 104, or the shared key K loaded to the SwMI 116 does not the shared key K loaded to the MS 104, the expected result XRES2 computed by the MS 104 will not match the result RES2 received by the MS 104 from the SwMI 116 via the proxy server 124. In such instances, the SwMI 116 and/or the MS 104 terminates the authentication process of the method 400. For example, the MS 104 may transmit an indication R2 that the result RES2 of the second authentication challenge does not match the expected result XRES2 of the second authentication challenge, and terminate the authentication process. Alternatively, the SwMI 116 may terminate the authentication process responsive to receiving an indication R2 that the result RES2 does not match the expected result XRES2 of the second authentication challenge. In contrast, when R2 indicates that the result RES2 does match the expected result XRES2 of the second authentication challenge, the authentication process of the method 400 continues.

Accordingly, using one or more aspects the techniques and processes described, the certificate received from the proxy server 124 during establishment of a secure IP session (e.g., a TLS session), may be authenticated in a manner which does not rely on using a public key of the certification authority that signed the certificate of the proxy server 124. The IP connection between the MS 104 and the proxy server 124 is considered a mutually authenticated connection that provides integrity and confidentiality without the MS 104 relying on trustworthiness of a root certificate holding the key of the certification authority that signed the proxy server certificate.

FIG. 5 illustrates an example method 500, performed by the MS 104 (e.g., using the electronic processor 212 in conjunction with other components of the MS 104), for mutually authenticating the SwMI 116 for IP-based communication. Some steps of the method 500 may be substantially similar to steps of the method 400 described above with respect to FIG. 4.

In the example shown, the method 500 includes establishing with the MS 104 responsive to detecting a trigger condition for operation in an IP-based communication mode, a secure TLS session with the proxy server 124 (at block 504). The initial connection to the proxy server 124 by the MS 104 is to, for example, a buffer zone or waiting area that is isolated from full functionality of the LMR network. For example, the MS 104 may only have access to authentication functionality of the LMR core 112. During establishment of the TLS session (at block 504), the MS 104 receives a certificate from the proxy server 124. Accordingly, the MS 104 computes a fingerprint or other data derived from the certificate received from and associated with the proxy server 124 (at block 508). The fingerprint computed by the MS 104 may cover some or all of the certificate received from the proxy server 124.

Responsive to establishing the TLS session with the proxy server 124, the MS 104 receives a first authentication challenge from the SwMI 116 via the proxy server 124 and determines a result of the first authentication challenge based at least on the fingerprint computed by the MS 104 (at block 512). The first authentication challenge may be substantially similar to the first authentication challenge described above with respect to the method 400.

Responsive to computing the result of the first authentication challenge (at block 512), the MS 104 transmits, to the SwMI 116 via the proxy server 124, a first response including a second authentication challenge and the result of the first authentication challenge (at block 516). The second authentication challenge may be substantially similar to the second authentication challenge described above with respect to block 416 of the method 400.

Responsive to transmitting the first response, the MS 104 receives, from the SwMI 116 via the proxy server 124, a second response including a result of the second authentication challenge and an indication that the result of the first authentication challenge, computed and transmitted by the MS 104, matches an expected result of the first authentication challenge (i.e., that the MS 104 is authenticated with respect to the SwMI 116) (at block 520). The MS 104 authenticates the SwMI by verifying that the result of the second authentication challenge matches an expected result of the second authentication challenge (at block 524). Verifying that the result of the second authentication challenge matches an expected result of the second authentication challenge may be substantially similar to the process described at block 428 of the method 400. Authenticating the SwMI 116 (at block 524) may also include transmitting an indication to the SwMI 116, via the proxy server 124, that the result of the second authentication challenge matches an expected result of the second authentication challenge.

In some instances, responsive to mutual authentication of the MS 104 and the SwMI 116 (e.g., authentication of blocks 520 and block 524), the MS 104 stores, in the memory 216, information related to the proxy server certificate (at block 528) to be used for subsequent IP connections to the proxy server 124. For example, subsequent to mutual authentication, the MS 104 may transmit a certificate signing request (CSR) to the proxy server 124, and store, in the memory 216, a signed certificate received from the proxy server 124.

Responsive to mutual authentication of the MS 104 and the SwMI 116, the MS 104 performs communications in the LMR network using the IP-based network 120 and the proxy server 124 (at block 532).

FIG. 6 illustrates an example method 600, performed by the SwMI 116 (e.g., using components of the LMR core 112), for mutually authenticating the MS 104 for IP-based communication. Some steps of the method 600 may be substantially similar to steps of the method 400 described above with respect to FIG. 4.

The method 600 includes receiving, with the SwMI 116 via the proxy server 124, a request from the MS 104 to register to the SwMI 116 (at block 604). Responsive to, or prior to, the request to register to the SwMI 116, the SwMI 116 computes a fingerprint of a certificate trusted by the SwMI 116 to be associated with the proxy server 124 (at block 608).

Responsive to receiving the request from the MS 104 to register to the SwMI 116, the SwMI 116 transmits a first authentication challenge to the MS 104 via the proxy server 124 (at block 612). The first authentication challenge may be substantially similar to the first authentication challenge described above with respect to block 408 of the method 400.

The SwMI 116 receives, from the MS 104 via the proxy server 124, a first response including a second authentication challenge and a result of the first authentication challenge (at block 616). The SwMI 116 authenticates the MS 104 by verifying that the result of the first authentication challenge matches an expected result of the first authentication challenge (at block 620).

The SwMI 116 determines and transmits, to the MS 104 via the proxy server 124, a result of the second authentication challenge, and transmits an indication that the result of the first authentication challenge matches the expected result of the first authentication challenge (at block 624). The second authentication challenge may be substantially similar to the second authentication challenge described above with respect to block 416 of the method 400.

The SwMI 116 receives, from the MS 104 via the proxy server 124, an indication that the result of the second authentication challenge matches an expected result of the second authentication challenge (at block 628). Responsive to mutual authentication of the MS 104 and the SwMI 116 (e.g., responsive to receiving the indication at block 628), the SwMI 116 enables communication by the MS 104 in the LMR network (e.g., with the LMR core 112) via the proxy server 124 (at block 632).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot communicate in radio networks, among other features and functions set forth herein).

The order of the steps of the methods 400, 500, and/or 600 described above with respect to FIGS. 4-6, respectively, may be implemented in a different order than described and illustrated. For example, the MS 104 may transmit an authentication challenge to the SwMI 116 prior to the SwMI 116 transmitting an authentication challenge to the MS 104. Additionally, the methods 400, 500, and/or 600 may include more or fewer steps than described and illustrated.

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A converged radio device comprising:
a radio-frequency (RF) transmitter system configured to perform communication in an internet protocol (IP) based network; and
an electronic processor configured to authenticate with a switching and management infrastructure (SwMI) of a second network of a different modality than the IP-based network by
establishing an unauthenticated secure IP session with a proxy server associated with the SwMI,
computing data derived from a certificate received from the proxy server during establishment of the secure IP session,
receiving, via the proxy server, a first authentication challenge from the SwMI,
determining a result of the first authentication challenge based on the data derived from the certificate,
transmitting a first response to the SwMI via the proxy server, the first response including a second authentication challenge and the result of the first authentication challenge,
receiving, from the SwMI via the proxy server, a second response including a result of the second authentication challenge and an indication that the result of the first authentication challenge matches an expected result of the first authentication challenge,
authenticating the SwMI by verifying that the result of the second authentication challenge matches an expected result of the second authentication challenge, and
responsive to authenticating the SwMI, performing communication in the second network via the proxy server.

2. The converged radio device of claim 1, wherein determining the result of the first authentication challenge includes computing a modified value based on a base value received or generated by the converged radio device during authentication with the SwMI and the data derived from the certificate.

3. The converged radio device of claim 2, wherein the electronic processor is configured to compute the modified value according to a hash function of the base value and the data derived from the certificate.

4. The converged radio device of claim 2, wherein
the first authentication challenge includes a random number and a random seed RS used for generating the random number, and
the modified value is a modified random number based on the random number and the data derived from the certificate.

5. The converged radio device of claim 2, wherein the first authentication challenge includes a random seed RS, and determining the result of the first authentication challenge further includes computing a session key KS based on the random seed RS and a shared key K, and computing the result of the first authentication challenge according to a function of the modified value and the session key KS.

6. The converged radio device of claim 5, wherein the second network is a land mobile radio (LMR) TETRA network, and the electronic processor is configured to compute the session key KS using a first TETRA algorithm, and the function of the modified value and the session key KS is a second TETRA algorithm.

7. The converged radio device of claim 1, wherein verifying that the result of the second authentication challenge matches an expected result of the second authentication challenge includes computing the expected result of the second authentication challenge based on the data derived from the certificate, and determining that the result of the second authentication challenge matches the expected result of the second authentication challenge.

8. A system for a switching and management infrastructure (SwMI) of a LMR network, the system comprising:

an electronic processor configured to authenticate a mobile station (MS) to the SwMI by receiving, from the MS via a proxy server associated with the SwMI, a request to register to the LMR network, transmitting, to the MS via the proxy server, a first authentication challenge, receiving, from the MS via the proxy server, a first response including a second authentication challenge and a result of the first authentication challenge, authenticating the MS by verifying that the result of the first authentication challenge matches an expected result of the first authentication challenge, determining a result of the second authentication challenge based on data derived from a certificate received from the proxy server, transmitting a second response to the MS via the proxy server, the second response including the result of the second authentication challenge and an indication that the result of the first authentication challenge matches an expected result of the first authentication challenge, responsive to receiving, from the MS via the proxy server, an indication that the result of the second authentication challenge matches an expected result of the second authentication challenge, enabling communication by the MS in the LMR network via the proxy server.

9. The system of claim 8, wherein determining the result of the second authentication challenge includes computing a modified value based on a base value received or generated by the SwMI during authentication with the MS and the data derived from the certificate.

10. The system of claim 9, wherein the second authentication challenge includes a random number, and the modified value is a modified random number based on a hash function of the random number and the data derived from the certificate.

11. The system of claim 9, wherein determining the result of the first authentication challenge further includes computing a session key KS' based on a random seed RS and a shared key K, and computing the result of the second authentication challenge according to a function of the modified value and the session key KS'.

12. The system of claim 11, wherein the LMR network is a TETRA network, and the electronic processor is configured to compute the session key KS' using a first TETRA algorithm, and the function of the modified value and the session key KS' is a second TETRA algorithm.

13. The system of claim 8, wherein verifying that the result of the first authentication challenge matches an expected result of the first authentication challenge includes computing the expected result of the first authentication challenge based on the data derived from the certificate, and determining that the result of the first authentication challenge matches the expected result of the second authentication challenge.

14. A method for mutually authenticating a LMR Mobile Station (MS) with a switching and management infrastructure (SwMI) of a LMR network, the method comprising:

establishing, with the MS, a secure internet protocol (IP) session with a proxy server associated with the SwMI;

receiving, with the MS via the proxy server, a first authentication challenge from the SwMI;

determining, with the MS, a result of the first authentication challenge based on first data derived from a certificate received from the proxy server during establishment of the secure IP session;

authenticating the MS by verifying, with the SwMI, that the result of the first authentication challenge matches an expected result of the first authentication challenge;

transmitting, with the MS, a second authentication challenge to the SwMI via the proxy server;

determining, with the SwMI, a result of the second authentication challenge based on second data derived from a certificate known to be from the proxy server;

authenticating the SwMI by verifying, with the MS, that the result of the second authentication challenge matches an expected result of the second authentication challenge; and responsive to mutual authentication of the SwMI and the MS, performing communication, with the MS, in the LMR network via the proxy server.

15. The method of claim 14, further comprising:

responsive to mutual authentication of the SwMI and the MS, storing in a memory associated with the MS, information related to the certificate received from the proxy server; and using the information related to the certificate received from the proxy server during authentication in a subsequent secure IP session with the proxy server.

16. The method of claim 14, wherein the method further comprises:

responsive to mutual authentication of the SwMI and the MS, transmitting, with the MS, a certificate signing request (CSR) to the proxy server.

17. The method of claim 14, wherein the secure IP session is a TLS session.

18. The method of claim 14, wherein the proxy server is a gateway to the LMR network.

US 12,683,810 B2

19

19. The method of claim 14, wherein, prior to mutual authentication of the MS and the SwMI and after establishment of the secure IP session with the MS, the proxy server restricts access of the MS to the LMR network.

20. The method of claim 14, wherein the MS connects to the proxy server from at least one selected from the group consisting of cellular network and a WiFi network, and mutually authenticating the MS with the SwMI is performed after authentication of the MS to the cellular network or the WiFi network.

\* \* \* \* \*

20